United States Patent
Wang et al.

[11] Patent Number: 6,075,203
[45] Date of Patent: *Jun. 13, 2000

[54] PHOTOVOLTAIC CELLS

[75] Inventors: Ying Wang, Wilmington; Larry Wayne Harrison, Bear, both of Del.

[73] Assignee: E. I. du Pont Nemours and Company, Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 09/080,653

[22] Filed: May 18, 1998

[51] Int. Cl.$^7$ .................................................. H01L 31/00
[52] U.S. Cl. .......................... 136/256; 429/111; 423/610
[58] Field of Search ............................ 136/256; 429/111; 423/610

[56] References Cited

U.S. PATENT DOCUMENTS

| | | | |
|---|---|---|---|
| 5,350,644 | 9/1994 | Graetzel et al. | 429/111 |
| 5,407,464 | 4/1995 | Kaliski | 75/746 |
| 5,421,909 | 6/1995 | Ishikawa et al. | 136/256 |
| 5,438,556 | 8/1995 | Dinger et al. | 368/205 |
| 5,441,827 | 8/1995 | Gratzel | 429/111 |
| 5,482,570 | 1/1996 | Saurer et al. | 136/255 |
| 5,525,440 | 6/1996 | Kay et al. | 429/111 |
| 5,681,402 | 10/1997 | Ichinose et al. | 136/256 |

FOREIGN PATENT DOCUMENTS

| | | | |
|---|---|---|---|
| 0 407 182 A2 | 1/1991 | European Pat. Off. | H01G 9/20 |
| 91/16719 | 10/1991 | WIPO | H01G 9/20 |

OTHER PUBLICATIONS

Mosaddeq-ur-Rahman, Md. et al., Investigation of solid state Pb doped $TiO_2$ solar cell, *Solar Energy Materials and Solar Cells*, 48, 123–130, 1997.

Music, S. et al., Chemical and microstructural properties of $TiO_2$ synthesized by sol–gel procedure, *Materials Science and Engineering*, B47, 33–40, 1997.

Nazeeruddin, M.K., et al.,, Conversion of Light to Electricity by cis-$X^2$Bis(2,2'-bipyridyl-4,4'-dicarboxylate)ruthenium(II) Charge—Transfer Sensitizers (X=$CL^-$, $Br^-$, $I^-$, $CN^-$, and $SCN^-$) on Nanocrystalline $TiO_2$ Electrodes, *J. Am. Chem. Soc.*, 115, 6382–6390, 1993.

O'Regan, B. et al. A low-cost, high efficiency solar cell based on dye-sensitized colloidal $TiO_2$ films, *Nature*, 353, 737–739, Oct. 24, 1991.

*Primary Examiner*—Mark Chapman

[57] ABSTRACT

Improved photovoltaic cells utilizing for a semiconductor layer, titanium dioxide powders, consisting of porous particles, ranging in size from 0.1 to 10 microns ($10^{-6}$ meters), and possess relatively high bulk density combined with high surface area.

6 Claims, 1 Drawing Sheet

PHOTOVOLTAIC CELLS

BACKGROUND OF THE INVENTION

The present invention relates to improved photovoltaic cells utilizing titanium dioxide powders consisting of porous particles, ranging in size from 0.1 to 10 microns ($10^{-6}$ meter), which possess relatively high bulk density combined with high surface area.

Photovoltaic cells are devices which convert radiant photon energy directly into electrical energy and are commonly used today in small electronic devices such as calculators and watches. These cells are manufactured in a variety of configurations, but generally comprise a layered structure on a substrate. Conventionally, a transparent electrically conductive material (known as an "electrode") is first deposited on a substrate, onto which is deposited a semiconductor material, followed by one or more layers of semiconductor and/or insulator material and/or conductive material. The last functional layer opposite the substrate must be a second electrode, i.e., transparent electrically conductive material. In use, radiant photon energy shines on the surface of the photovoltaic cell causing electrons to move between the electrodes on the cell. The movement of electrons creates an electrical potential difference and, therefore, the generation of an electric current.

Titanium dioxide films are notable for their semiconductive properties and, as such, are useful as the semiconductive components of photovoltaic cells. However, conventional titanium dioxide has little absorbance of light in the visible region and often needs to be combined with or coated with a photosensitive material, such as a dye or chromophore, which absorbs light in the wavelengths emitted by the sun.

EP 407 182 discloses a multilayered photovoltaic cell in which nanometersized titanium dioxide, prepared from colloidal solution, is utilized as a semiconductive layer. While some level of conversion is reported for the titanium dioxide alone, it is disclosed that niobium doped titanium dioxide gave superior results and it is suggested that dye sensitized titanium dioxide and/or doped titanium dioxide is the optimum choice. Given the recognized absorbance deficiencies of titanium dioxide, much work has been devoted to the study of photovoltaic cell configurations and dyestuff additives to improve the absorbency of titanium dioxide in the visible range. For example, WO 91/16719 discloses doping the titanium dioxide with a divalent or trivalent metal to enhance the absorbency. U.S. Pat. No. 5,350,644 discloses a further variation on utilizing doped titanium dioxide wherein a multiplicity of layers of titanium dioxide are formed on the substrate of the photovoltaic cell with the requirement that a dopant be applied to the outermost titanium dioxide layer and further that a photosensitizer be additionally applied to the dopant-containing titanium dioxide layer. U.S. Pat. No. 5,441,827 describes photovoltaic cells using titanium dioxide as the semiconductive material, wherein the colloidal particles making up the titanium dioxide layer have a diameter which is smaller than the diffusion length of the minority charge carriers. Such a restriction requires that the diameter be less than about 100 or 200 nanometers ($10^{-9}$ meter) and particles in the size range of 15 nanometers were found to be the optimal size for photovoltaic application. See, e.g., Gratzel et al., "A low-cost, high efficiency solar cell based on dye-sensitized colloidal $TiO_2$ films", NATURE, Volume 353, pages 737–738 (Oct. 24, 1991).

The colloidally prepared titanium dioxide utilized in the art to date has some well-recognized disadvantages due to the very small particle size. For example, this nanoparticle titanium dioxide is very difficult to handle due to the low bulk density and tends to become easily airborne requiring special safety precautions in handling. When stored as colloidal solution, the shelf life is short. This is due to the aggregation of $TiO_2$ particles which precipitates out of the solution.

This invention provides for an improved photovoltaic cell utilizing a highly porous, high bulk density titanium dioxide in the size range larger than those disclosed in the art. The use of large, porous $TiO_2$ particles allows for safe and easy handling of the particles and also retains the high photovoltaic efficiency of nanometer-sized $TiO_2$, a combination of the best of both materials.

Known solution based methods to produce titanium oxide powders tend to be inefficient with respect to pounds of product per reactor volume, washing of the precipitated products to reduce anions to an acceptable level, and filtration time. The present invention improves upon all of these deficiencies of the prior art to provide processes with greater volume efficiency to achieve more product per reactor volume. The present invention also provides processes that require less water and less time to wash the products to acceptable ionic conductance levels.

SUMMARY OF THE INVENTION

Figure 1:
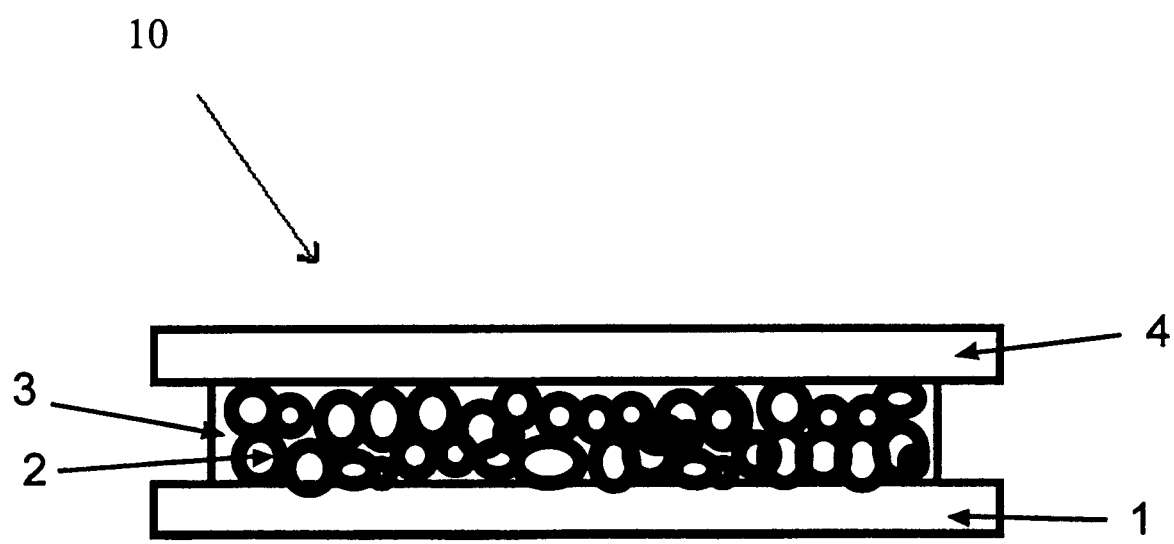
FIG. 1 is a schematic illustration of a typical dye-sensitized $TiO_2$ photovoltaic cell in cross-section.

The present invention provides an improved photovoltaic cell, comprising a bottom electrically conductive layer, at least one semiconductor layer and a top electrically conductive layer, wherein the at least one semiconductor layer consists essentially of titanium dioxide particles, said particles having a size of 0.1 to 10 microns and being aggregates of crystallites less than $100 \times 10^{-9}$ meters in size.

The titanium dioxide utilized in this invention has an open pore structure wherein the average pore volume is at least 0.005 cc/g for any $0.5 \times 10^{-9}$ meter pore diameter size increment within a pore size range of 2 to $10 \times 10^{-9}$ meter.

DETAILED DESCRIPTION OF THE INVENTION

The photovoltaic cells which can benefit from the improvement of this invention include all known thin layer cells such as the Schottky diode type, i.e., metal-semiconductor (MS) junction cells, metal-insulator-semiconductor (MIS) junction cells, semiconductor-insulator-semiconductor (SIS) junction cells, and heterojunction and homojunction cells. Processes for the manufacture of these cells are widely known and are described, for example, in U.S. Pat. No. 5,482,570, the disclosure of which is incorporated herein by reference.

The semiconductor layer in accordance with this invention can be deposited by a conventional thick film screen printing technique. For example, thick film pastes are prepared by mixing the milled $TiO_2$ with a ethyl cellulose/beta terpeniol polymer solution. A Hoover Muller is used to compound the $TiO_2$/polymer into the viscous paste used for screen printing. The substrates are patterned by using 360 mesh stainless steel screens with bottom emulsions ranging from $5.8 \times 10^{-6}$ meter to $3.8 \times 10^{-5}$ meter in thickness. All parts are printed using a lab scale hand printer. The prints are dried at 125° C. for 10 minutes then sintered at 450° C. for 1 hr.

The titanium dioxide particles having the set of characteristics required by this invention can be prepared in accordance with the disclosure of copending, commonly assigned application number 08/927,448, filed Sep. 11, 1997. Typically, the appropriate titanium dioxide particles can be made by:

(1) preparing an acidic titanium salt solution, typically aqueous, of at least one titanium salt of from about 10% to about 50% total titanium salt, (2) precipitating the titanium dioxide particles by adding the acidic titanium salt solution to an aqueous basic solution containing at least 20% base while maintaining the temperature at from about 20° C. to about 95° C., after rapid initial heating of reaction and dilution, until a pH of from about 2 to about 4 is reached.

To improve photovoltaic efficiency and allow for the use of thick film techniques in sample preparation, the agglomerate and particle size of the samples prepared by the above procedures is often reduced by milling. The precipitated and dried oxide is first crushed to a −50 mesh size using a mortar and pestle. The oxide is calcined at 500° C. for 1 hr and added to a #00 rubber lined ball mill ½ full of high density 10 mm YTZ media. Isopropyl alcohol is used as the grinding solvent, this is added to the mill containing the media and sample until the liquid level covers the media/sample in the mill. Typically 200 cc's is required for milling. The mill is than rolled at a speed of 180 rpm for a total of 18 hours. The resulting slurry is dried on a hot plate over low heat for 4 hours. Agglomerate size is reduced to a d50 of 0.5–7$\mu$ after milling.

If it is desired to dope the titanium dioxide particles with some other metal, one may do so by the following steps:

(1) preparing an aqueous salt solution of a titanium metal salt and an aqueous salt solution of a dopant metal salt, (2) adding a major portion of the aqueous salt solution to an aqueous basic solution containing at least 20% base and maintaining the temperature at from about 50° C. to about 95° C. after rapid initial heating of reaction and dilution, to yield a first mixture, (3) combining the remaining titanium metal salt solution with the dopant metal salt solution to yield a second mixture, and (4) completing the precipitation of the doped titanium dioxide particles by adding the second mixture to the first mixture until a pH of from about 2 to about 4 is reached.

For each of the above processes, the solid particulate titanium dioxide is recovered by filtration, washed to a washwater ionic conductance of about 500 micromhos (microsiemens) or less and then dried and optionally calcined.

EXAMPLES

The basic configuration of a dye-sensitized $TiO_2$ photovoltaic cell is shown in FIG. 1, and comprises a sandwich-type structure 10 having a fluorinedoped tin oxide glass (FTO) substrate 1, a $TiO_2$ layer coated with sensitizer dye 2; an electrolyte solution 3; and a platinum coated indium-tin oxide glass (ITO) substrate 4. Typically, in constructing this structure, $TiO_2$ solution (or paste) is either doctor-knifed or screen printed onto a fluorine-doped tin oxide glass (1) to form a thin-film of 5–10 microns thickness. This film is then sintered at ~450° C. The sensitizing dye is deposited onto the $TiO_2$ particles by simply soaking the film in an ethanol solution containing $3\times10^{-4}$ M cis-Di(thiocyanato)-N,N-bis (2,2'-bipyridyl-4,4'-dicarboxylic acid)-ruthenium (II) dihydrate dye. The dye-adsorbed $TiO_2$ film (2) is then dried and sandwiched with a Pt-coated indium-tin oxide glass (4) to form the photovoltaic cell. The electrolyte solution (for example: 0.5 M Lithium iodide and 0.04 M $I_2$ in 4:1 ethylene carbonate/acetonitrile) is then drawn into the cell. Sealing of the cell with adhesives completes the fabrication process.

The ITO or FTO conducting glass substrates are cleaned before use with a vapor degreaser containing chloroethene. The parts are held in the solvent vapor for 20–24 hours. After removing from the degreaser, the parts are thermally cleaned by heating to 400° C. and holding for 1 hr.

Pt was deposited onto the indium-tin oxide glass by RF sputtering with a Denton Desk II sputtering unit.

The efficiency of the photovoltaic cell is determined by measuring their current-voltage curves under the illumination of a 75W xenon lamp. The overall efficiency of the photovoltaic cell, $\eta_{global}$, is calculated from the short-circuit photocurrent density, $i_{ph}$, the open-circuit photovoltage, $V_{oc}$, the fill factor of the cell, ff, and the intensity of the incident light, I, using the following equation:

$$\eta_{global}=i_{ph}\cdot V_{oc}\cdot ff/I$$

Since the xenon lamp used is not a calibrated solar lamp, the measured photovoltaic efficiency does not correspond to the actual conversion efficiency under solar conditions. The measured values are used relatively for comparison purpose.

Example 1

This Example substantially follows the procedure described by Gratzel et al., supra. Inside a glove box, 12.5 mL titanium isopropoxide was placed in a small dropping funnel. The funnel was capped and removed from the glove box and attached to a round bottom flask which contained a stirred solution of 75 mL 0.1 M nitric acid in high purity water. The Ti material was slowly dripped into the nitric acid solution under a nitrogen blanket and with vigorous stirring. When everything was added, the solution was heated and stirred at 80° C. for >8 hours to give a clear solution. The solution was then filtered to remove dust and any particulates.

The solution volume was adjusted to 70 mL with water and then autoclaved without shaking at 235° C. for 12 hours. The milky white slurry was thoroughly mixed by ultrasonication and then rotovapped to a final volume of 35 mL at room temperature. This white slurry was used for screen printing of $TiO_2$ films after the addition of 1 g polyethyleneglycol (mol.wt. 14,000) as a viscosity enhancer/binder prior to the film deposition.

Deposited films on FTO were sintered at 450° C. for 1 hour in flowing air prior to dye impregnation. Photovoltaic cell was constructed with these $TiO_2$ using procedures described before. The efficiency was measured to be 2.2% at a light intensity of 25 mW/cm$^2$ from a xenon lamp. This cell is used as a reference.

Example 2

In this example, relativity large particle size pigmentary $TiO_2$ prepared using a conventional chlorine oxidation process were used. In the chlorine oxidation process, purified $TiCl_4$ is burned in $O_2$ along with an additional gas such as CO which is used to increase and maintain the temperature of the reactants in the preliminary stage. Nucleation in the reactor is necessary to promote the formation of pigmentary particles. This is achieved by introducing a small amount of water vapor to the oxygen stream or by the combustion of hydrocarbons. Additionally, small amounts of $SiCl_4$ and $PCl_3$ are added to the gas stream to suppress formation of the rutile phase. Because the growth rate is very rapid, the gases carrying the pigment are rapidly cooled to minimize further growth. Separation of the pigment then follows with the chlorine being compressed and condensed to a liquid for further use. The pigment is then washed to a neutral pH while heating with steam to remove any adsorbed chlorine.

The final step in the process is to reduce particle and agglomerate size by media milling the washed pigment. The final $TiO_2$ has an average (d50) particle size of 410 nm in anatase form.

A photovoltaic cell was constructed with these $TiO_2$ using procedures described above. The efficiency was measured to be 0.04% at a light intensity of 25 mW/cm$^2$ from a xenon lamp. This example demonstrates that conventional large $TiO_2$ particles (that is, non-porous) are not effective for photovoltaic application.

Example 3 a. Preparation of "cut" $TiCl_4$ solution

As a first step it was necessary to make an aqueous titanium tetrachloride solution by carefully reacting pure $TiCl_4$ with deionized (DI) water. A significant number of precautions must be taken so as to accomplish this reaction safely, due to the hazardous nature of handling $TiCl_4$ and the strong exothermic reaction that occurs when it comes in contact water. Diluting $TiCl_4$ with water results in the formation of titanium oxychloride, but for the purposes of these discussions the aqueous $TiCl_4$ solution will be referred to as "cut" $TiCl_4$.

The dilution of $TiCl_4$ with DI water was carried out in a 4-neck 3 liter round bottom glass flask. A greased glass rod with a Teflon® coated paddle was inserted into the middle neck and attached to a lab motor. A greased condenser was inserted into a side neck and fitted with a rubber septum at the top through which a syringe was inserted to provide a nitrogen gas purge during the reaction so as to keep air moisture in the glass flask to a minimum. A Teflon® taped dropping funnel, with a side arm, was inserted into a third neck, which would later be charged with $TiCl_4$ solution and used to feed that solution into the DI water contained in the glass flask. A greased thermometer was inserted into the small side neck of the flask so that the temperature during the reaction could be monitored.

The glass flask was secured by clamps to a pole and lowered about halfway into a plastic bucket containing ice and water. 1000 grams of chilled DI water was charged to the glass flask. Agitation of the water and a nitrogen gas purge were both started. The one liter glass bottle containing 99.9% $TiCl_4$ solution, obtained from Aldrich Chemical Company Inc. (cat. #20,856-6), had been chilled on ice for about 30 minutes before opening so as to minimize the fuming. When the chilled bottle was opened, the $TiCl_4$ solution was poured into the dropping funnel with the aid of a glass funnel. Approximately 450 grams of $TiCl_4$ solution was added and the dropping funnel was then loosely capped by inserting a rubber septum. The septum was not used to seal the funnel opening but only close it up and allow the incoming nitrogen gas purge a place to escape. The dropping funnel was then opened and the $TiCl_4$ solution was slowly added to the chilled water in the glass flask while maintaining agitation. The rate of addition was varied so as to maintain a liquid temperature in the flask between 10 and 40° C. As expected, strong fuming in the flask from the $TiCl_4$ and water reaction resulted in a thick cloud of vapor, however, this fuming was contained mainly in the flask as the chilled water condenser functioned properly and only a trace amount of vapor was venting from the loosely fitted rubber septum at the top of the dropping funnel.

Twice during this reaction, additional $TiCl_4$ solution was charged to the dropping funnel so that a total of 1107 grams was added. After the $TiCl_4$ addition was complete, 108 grams of DI water was used to rinse down the side walls of the glass reaction vessel. The total amount of DI water added was 1108 grams. The clear yellow solution of "cut" $TiCl_4$ had an observed weight of 2171 grams (theoretical weight= 2215 grams). The difference of 44 grams is attributed mainly to an HCl:water vapor loss during the course of the reaction. The theoretical concentration of $TiCl_4$ in the "cut" $TiCl_4$ solution, assuming no mass loss, is 50%. The actual concentration of the solution was checked by oven drying and then ashing a small sample of the solution in a vented furnace at 600° C. for 15 minutes. The observed concentration of $TiCl_4$ was 47.5% based on moles of $TiO_2$ obtained from the ashing experiment.

b. Porous $TiO_2$ particles from the NaOH route

Seventy-five grams of 50% aqueous NaOH was charged to a 400 ml beaker and stirred with a Teflon® coated paddle that was attached to a lab motor. A dropping funnel was charged with 105.8 grams of a "cut" $TiCl_4$ solution made in accordance with the above procedure and having a nominal $TiCl_4$ concentration of 40%. The "cut" $TiCl_4$ solution was slowly added to the aqueous NaOH solution taking approximately 20 minutes to complete the addition. The final pH of the slurry was 3 and the maximum temperature observed during the reaction was between 70 and 90° C. The slurry was transferred to a Buchner funnel (11 cm in diameter) with filter paper and washed with approximately 3 liters of DI water down to an ionic conductance of 20 micromhos. The total wash time was 5 hours.

The bulk density as measured from mercury intrusion data was 0.40 g/cc and the B.E.T. surface area was 404 m$^2$/g. Using nitrogen intrusion data, the calculated BJH cumulative desorption surface area of pores between $1.7 \times 10^{-9}$ meters (17 angstroms) and $300 \times 10^{-9}$ meters (3,000 angstroms) was 519 m$^2$/g and the BJH cumulative desorption pore volume of pores between that same range was 0.69 cc/g. The crystalline powder phase was identified as 100% anatase having a crystallite size of $4.3 \times 10^{-9}$ meters based on X-ray line broadening of the (101) peak. The particle size distribution parameters, $d_{16}$, $d_{50}$, and $d_{84}$ were 1.0, 3.0, and 12.5 microns respectively.

c. Porous $TiO_2$ particles from the $NH_4OH$ route

A 400 ml beaker was charged with 142 grams of $NH_4OH$ (28–30%), which was chilled using an ice bath, and stirred using a Teflon® coated paddle stir attached to a stirring motor. A peristaltic pump was used to delivery 195 grams of $TiCl_4$:DI water (40/60 wt. %) at a rate of 15 cc's/min to the rapidly stirring $NH_4OH$.

The end pH of the precipitation was 3 and the maximum temperature observed during the reaction was between 60–65° C.

The viscous slurry was filtered using a glass fritted funnel and washed with 10 liters of DI water to a ionic conductance of 7 micromhos. The washed and filtered oxide was dried at 125° C.

The bulk density as measured from mercury intrusion data was 0.64 g/cc and intrusion volume was 1.03 g/cc. The B.E.T. surface area was 394 m$^2$/g and the crystalline powder phase was identified as 100% anatase.

d. Milling of the porous $TiO_2$ particles

The precipitated and dried oxide from Example 3b or 3c is first crushed to a −50 mesh size using a mortar and pestle.

The oxide is calcined at 500° C. for 1 hr and added to a #00 rubber lined ball mill ½ full of high density 10 mm YTZ media. Isopropyl alcohol is used as the grinding solvent, this is added to the mill containing the media and sample until the liquid level covers the media/sample in the mill, typically 200 cc. The mill is than rolled at a speed of 180 rpm for a total of 18 hours. The resulting slurry is dried on a hot plate over low heat for 4 hours. Agglomerate size is reduced to a d50 of 0.5–0.7µ after milling.

Example 4

The $TiO_2$ used in this cell was made as per Example 3c and milled according to 3d. Standard thick film techniques were used to prepare a viscous paste composed of 3 parts polymer solution (10% polymer solids by weight in beta terpiniol) to 1 part $TiO_2$. The paste was applied to FTO substrates by conventional screen printing techniques. The printed parts were dried at 125° C. and sintered at 400° C. for 1 hr.

A photovoltaic cell was constructed from these sintered samples using procedures described previously. The efficiency was 3.5% at a light intensity of 25 mW/cm² from a xenon.

Example 5

This sample was prepared using the techniques described in Example 4. However the sintering temperature for the screen printed substrates was increased to 550° C. for 1 hr.

A photovoltaic cell was constructed from these sintered samples using procedures described previously. The efficiency was 3.5% at a light intensity of 25 mW/cm² from a xenon lamp.

Example 6

The $TiO_2$ used in this cell was made as per Example 3b and milled according to 3d. The dried and milled $TiO_2$ was first dispersed in isopropyl alcohol and allowed to settle for 1 hr. The large particles and agglomerates (>1 micron) were removed by classifying the dispersion. The particle size was measured using a Horiba LA-500 particle size analyzer and found to have an average size of 0.5 microns.

Samples were next prepared using the procedure described in Example 4. These were screen printed two times (drying in between prints) to increase thickness of the sintered film. The parts were sintered at 450° C. for 1 hr and had an average fired thickness of 8.4 microns.

A photovoltaic cell was constructed from these sintered samples using procedures described previously. The efficiency was 3.3% at a light intensity of 25 mW/cm² from a xenon lamp.

Example 7

This sample was made from the classified $TiO_2$ used in Example 6. The organic/inorganic ratio was reduced from 3 parts to 2 parts polymer solution to 1 part $TiO_2$. A single screen print was applied. The parts were sintered at 450° C. for 1 hr and had an average fired thickness of 8.9 microns.

A photovoltaic cell was constructed from these sintered samples using procedures described previously. The efficiency was 3.5% at a light intensity of 25 mW/cm² from a xenon lamp.

What is claimed is:

1. A photovoltaic cell comprising, in order:
   a) a bottom layer comprising an electrically conductive material;
   b) at least one semiconductor layer;
   c) an electrolyte solution in contact with at least one semiconductor layer of b); and
   d) a top layer comprising an electrically conductive material;
   e) wherein the at least one semiconductor layer consists essentially of titanium dioxide particles, said particles having a size of 0.1 to 10 microns and being aggregates of crystallites, said aggregates having an open pore structure, and said crystallites having a size of less than 100×10−9 meter.

2. The photovoltaic cell of claim 1, wherein the titanium dioxide particles have an average pore volume of at least 0.005 cc/g for any 0.5×10−9 meter pore diameter size increment within a pore size range of 2 to 10×10−9 meter.

3. The photovoltaic cell of claim 1, wherein said bottom layer comprises fluorine-doped tin oxide glass.

4. The photovoltaic cell of claim 1, wherein said top layer comprises platinum coated indium-tin oxide glass.

5. The photovoltaic cell of claim 1 wherein said electrolyte solution comprises iodide salt and iodine.

6. A photovoltaic cell comprising, in order:
   a) a bottom layer comprising a fluorine-doped tin oxide glass substrate;
   b) at least one semiconductor layer wherein one of said semiconductor layers consists essentially of dye-sensitized titanium dioxide particles;
   c) an electrolyte solution in contact with at least one semiconductor layer of b), said electrolyte solution comprising iodide salt and iodine; and
   d) a top layer comprising a platinum coated indium-tin oxide glass substrate; said dye-sensitized titanium dioxide particles having a size of 0.1 to 10 microns, and being aggregates of crystallites, said aggregates having an open pore structure, and said crystallites having a size of less than $100 \times 10^{-9}$ meter.

* * * * *